Nov. 13, 1956 L. D. SACRE 2,770,137

COUPLING MECHANISM

Filed July 25, 1955

INVENTOR.
Leo D. Sacre
BY
Mueller & Aichele
Attys.

2,770,137
Patented Nov. 13, 1956

2,770,137

COUPLING MECHANISM

Leo D. Sacre, Prospect Heights, Ill., assignor to Motorola, Inc., Chicago, Ill., a corporation of Illinois Application July 25, 1955, Serial No. 524,225

5 Claims. (Cl. 74—10.33)

This invention relates generally to push button control systems and more particularly to a selector including push buttons and a continuous manual control such as may be used for controlling the position of tuning elements in a wave signal receiver.

Push button control units are provided in many applications for providing pre-set positions of a control unit which may also be moved to any desired position by a rotary manual control. In order to make the push buttons in such a system operate as easily as possible, it is common practice to disengage the push button operating mechanism from the continuous rotary control as push button operation is initiated so that the desired change in position may be accomplished through the push button action by the exertion of a minimum of force.

One important use for such push button control mechanism is in the tuning of a radio receiver. Such controls are particularly advantageous in a radio receiver for use in an automobile as push button operation simplifies the tuning of the radio by the person operating the automobile. In such case to permit accurate manual tuning of a desired frequency a speed reduction device is required between the manual tuning knob and the mechanism which controls the position of elements for determining the frequency of the receiver.

It is an object of the present invention to provide a selector device with push button and continuous control having an improved mechanism for disengaging the continuous control during push button operation.

A further object of the invention is to provide an improved mechanism for coupling a continuous manual control to controlled elements which provides reduction in speed between the manual control and the controlled elements and which permits disengagement of the manual control.

A further object of the invention is to provide an easily operatable release mechanism for the manual tuning control of an automobile radio receiver.

A feature of the invention is the provision of a ball structure for coupling a manual control to a push button control which includes inner and outer races having balls therebetween and a retainer for the balls, with the coupling being provided between the races, or between one of the races and the retainer when the part not used for coupling is held stationary, and which coupling is released when such part is free to turn.

A further feature of the invention is the provision of a disengageable ball coupling structure for a manual tuning control wherein the control is connected to the inner race and the tuning element is connected either to the outer race or to the ball retainer, so that the coupling is released when the part not connected to the tuning element is released, and the tuning element is rotated at reduced speed through the action of the balls when the said part is held against rotation. It will be apparent that reduction in speed takes place regardless of whether the tuning element is connected to the retainer or the outer race.

Further objects, features and the attending advantages of the invention will be apparent from a consideration of the following description when taken in connection with the accompanying drawings in which.

Figure 1:
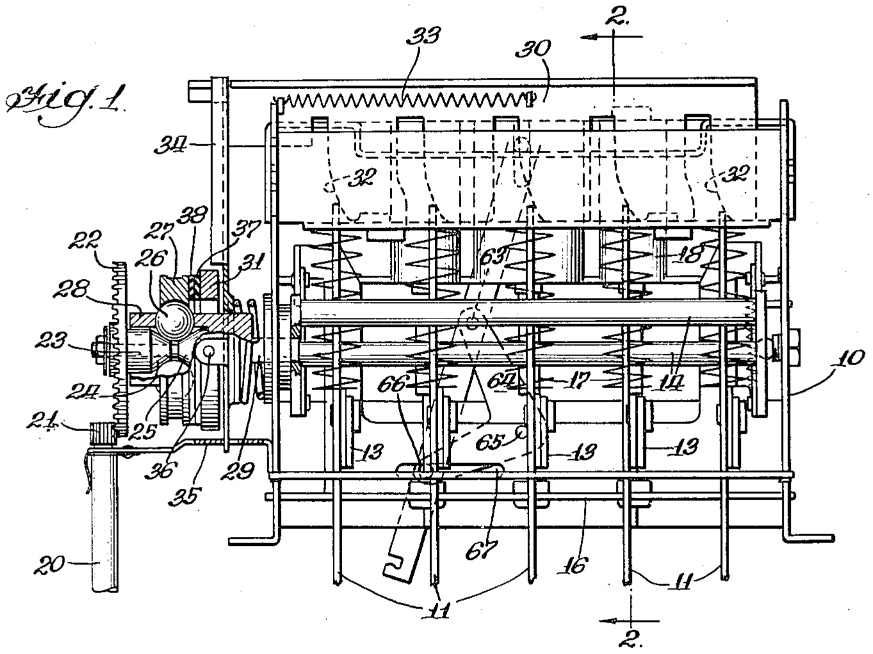
Fig. 1 is a plan view partly broken away illustrating the coupling arrangement for a push button selector in accordance with the invention.
Figures 2, 3, 4:
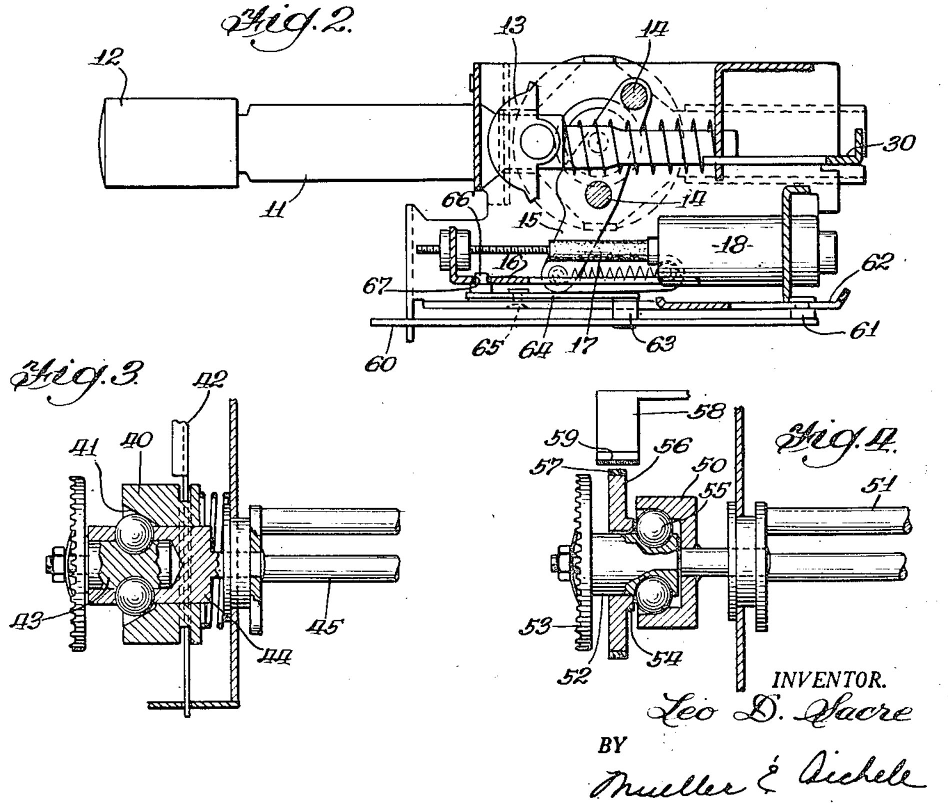
Fig. 2 is a cross-section view along the lines of 2—2 of Fig. 1.
Fig. 3 shows a modified ball coupling structure.
Fig. 4 shows a further ball coupling arrangement.

Referring now to the drawing, in Figs. 1 and 2 there is shown a tuning mechanism including a frame 10 which supports a plurality of plungers 11 connected to push buttons 12. Each plunger includes a cam 13 adjustably positioned thereon and adapted to engage the bars 14 of a treadle bar adjusting mechanism. Connected to the bars is an arm 15 for moving carriage 16 to which are connected cores 17 movable within coils 18. The coils 18 may be connected in a wave signal receiver circuit for adjusting the frequency thereof.

For providing continuous manual control of the tuning cores, a shaft 20 is provided which may be connected to a manual tuning knob not shown. The shaft has a pinion 21 at the end thereof cooperating with crown gear 22. The crown gear is connected to a shaft 23 having conical portions 24 and 25 which form an inner race for the balls 26. An outer race 27 is provided about the balls 26 and a retainer sleeve 28 is positioned between the inner and outer races which includes openings for receiving the balls. The retainer 28 is connected to a shaft 29 which is connected to the treadle bars 14 for turning the same. Accordingly, the treadle bars 14 may be positioned either by operation of the push buttons through action of the cams on the plungers thereof, or by rotation of the continuous tuning control 20.

In order to make the push button operation as easy as possible, it is desired to disengage the manual control during push button operation to thereby remove the load caused by back driving the crown gear 22 and the pinion 21. It is also desired that the manual knob not rotate during push button operation. Both of these features are accomplished in the structure shown by operation of a latch mechanism including the slidable latch plate 30 and the friction ring 31. The slidable plate 30 includes cam surfaces 32 which are engaged by the inner ends of the plungers 11 when pushed inwardly. This engagement causes the latch plate 30 to move to the right against the action of spring 33. The plate 30 is connected to one end of arm 34, the other end of which is positioned in a slot in the bracket 35 connected to the tuner frame. As the plate 30 moves to the right, the upper end of arm 34 will also move to the right, with the arm pivoting about the opening in the bracket 35. The friction ring 31 is pivotally connected to the arm 34 at diametrically opposite points 36 and moves to the right with the arm 34. This releases the frictional engagement between the friction surface 37 on the ring 31 and the friction surface 38 connected on the outer race 27.

Considering now the operation of the ball coupling mechanism, when the parts are in the position shown with the plate 30 pulled to the left by spring 33 so that the arm 34 is urged to the left, the friction ring 31 retains the outer race 27 stationary by action of the friction surfaces on the two rings. Rotation of the shafts 20 and 23 causes rotation of the inner race so that the balls 26 rotate within the outer race which is held stationary. As the balls move around within the outer race the retainer 28 will also rotate to rotate the shaft 29 and the treadle bar. It will be apparent that the operation of the balls results in a reduction in speed of the shaft 29 with respect to the shaft 23. This is desirable as it reduces the ratio required between the pinion 21 and the crown gear 22 to provide smoother operation of the manual tuning control.

When a push button is depressed to provide movement of the treadle bar 14 to a preset position, the plunger 11 associated with the operated button engages a cam surface 32 on the sliding plate 30 to cause the plate to move to the right as previously stated. This causes the friction ring 31 also to move to the right to release the frictional engagement between the ring 31 and the outer race 27. Accordingly, movement of the retainer 28 resulting from change of position of the treadle bars 14 will cause the ball 28 to roll about the inner race formed by the conical portions 24 and 25, and the outer race 27 will move freely. This action results because the load on the inner race resulting from the crown gear 22 and the pinion 21 is greater than the load on the outer race which is now free to rotate. Therefore the manual shaft will not rotate, and the load on the shaft 29 connected to the retainer 28 will be very slight, merely that caused by the movement of the balls 26 and the outer race 27. Accordingly, the force which must be applied to the push buttons is thereby reduced.

In order to indicate the position of the tuning elements, a lever arm mechanism may be connected to the carriage 16. This includes an arm 60 having a rear support 61 slidably mounted in a slot 62 in the frame 10. The arm 60 is pivotally connected at 63 to an arm of a crank 64, the center of which is pivotally connected to the frame at 65. The other arm of the crank 64 is connected to the carriage 16 by pin 66 operating in slot 67 in the carriage. Accordingly the front end of the arm 60 will move across the front of the tuner to indicate the movement of the carriage from the front to the back of the frame, so that an indication of the position of the tuning elements will be provided by the front of the arm 60.

In Fig. 3 there is illustrated a further embodiment of the ball coupling unit wherein when outer race 40 has a conical ball engaging surface 41. This race is directly moved along its axis by the arm 42 which may be connected to a release mechanism such as the sliding plate 30, of Fig. 1. It will be apparent that in the position shown the arm 42 engages the outer race 40 to prevent rotation thereof so that movement of the inner race 43 is transferred to the retainer 44 to move the treadle bar 45. When the arm 42 is moved to the right by action of a push button, the race 40 is also moved to the right to relieve the pressure on the balls so that movement of the treadle bar 45 which is connected to the retainer 44 causes the balls to move freely about the inner race 43, which remains stationary, without substantially resisting such movements.

In Fig. 4 there is illustrated a still further embodiment wherein the outer race 50 is connected to the treadle bar 51 and the inner race 52 is connected to a crown gear 53 which is coupled to the manual control as in the previous embodiments. The retainer 54 for the balls 55 has a rim 56 with a cylindrical frictional surface 57 adapted to be engaged by arm 58. This arm 58 has a frictional surface 59 for engaging the frictional surface 57 on the retainer. In this embodiment the arm 38 will normally be positioned so that the frictional surfaces 57 and 59 are in engagement to prevent rotation of the retainer. Accordingly rotation of the crown gear 53 will cause rotation of the inner race 52 and this rotation will be transferred through the balls to the outer race 50 coupled to the treadle bar 51. When a push button is depressed the plunger thereof will move the arm 58 so that the frictional surface 59 thereon moves away from the frictional surface 57 of the retainer. This will permit the retainer 56 to move freely. Accordingly movement of the treadle bar 51 will be transferred to the outer race 50 causing the balls 55 to rotate about the inner race 52. This will cause the retainer to move freely but will not impose a load on the treadle bar since the inner race 52, the crown gear 53 and the mechanism coupled thereto remain at rest. As previously stated this also provides the advantage that the manual tuning shaft is not rotated during push button operation.

It is therefore seen that the coupling arrangement provided has the dual advantage of providing a disengageable coupling between the manual rotary control and the elements to be positioned and further provides speed reduction so that precise positioning of the elements can be accomplished without unduly critical operation of the manual control. Considered in a different manner, manual tuning can be provided without providing a high gear ratio in the mechanism coupling the manual control to the element being positioned. Also, the manual control knob does not move during push button tuning. In the arrangement disclosed very light pressure is required for holding the element of the ball structure in order to cause transfer of rotation therethrough. For this reason the mechanism for releasing the member can be quite simple and yet provide the desired operation.

I claim:

1. In a selector mechanism for controlling the position of a member and which mechanism includes push buttons for providing predetermined positions of the member and rotary driving means for providing continuous movement of the member from one position to another, means for disengaging said rotary driving means from the member to be positioned in response to operation of a push button including in combination, a first part forming an inner race for a ball structure, a second part forming an outer race for the ball structure, a plurality of balls positioned between said inner and outer races, a third part positioned between said inner and outer races and having retainer portions for receiving said balls therein, two of said parts being individually connected to said rotary driving means and the member to be positioned, and latch means normally engaging the other one of said parts for retaining the same against rotation to thereby provide a driving connection between said two parts through said balls, said latch means being operated in response to the operation of a push button to release said other part and thereby disengage said rotary driving means.

2. In a selector mechanism for controlling the position of a member and which mechanism includes push buttons for providing predetermined positions of the member and rotary driving means for providing continuous movement of the member from one position to another, a ball structure for coupling said rotary driving means to the member to be positioned including in combination, a first part forming an inner race for the ball structure, a second part forming an outer race for the ball structure, a plurality of balls positioned between said inner and outer races, a third part positioned intermediate said first and second parts and having retainer portions for receiving said balls therein, two of said parts being individually connected to said rotary driving means and the member to be positioned, and latch means normally holding the other one of said parts against rotation to thereby provide a driving connection between said two parts through said balls, said latch means being operated in response to the operation of a push button to release said other part and thereby disengage said rotary driving means.

3. In a selector mechanism for controlling the position of tuning elements of a wave signal receiver, and which mechanism includes a treadle bar unit having push buttons for providing predetermined positions of the tuning elements and rotary driving means for providing continuous movement of the tuning elements from one position to another, a ball coupling device for selectively connecting the rotary driving means to the treadle bar unit and operated in response to operation of a push button, said coupling device including in combination, a first part forming an inner race for a ball structure, a second part forming an outer race for the ball structure, a plurality of balls positioned between said inner and outer races, a third part having retainer portions for receiving said balls therein positioned between said inner and outer races, said first part being connected to said rotary driving means, one of said second and third parts being connected to the treadle bar unit, and latch means positioned to engage the other of said second and third parts for retaining the same against rotation to thereby provide a driving connection between said first part and said one part through said balls, said latch means being operated in response to the operation of a push button to release said other part and thereby disengage said rotary driving means from said treadle bar unit.

4. In a selector mechanism for controlling the position of tuning elements of a wave signal receiver, and which mechanism includes a treadle bar unit having push buttons for providing predetermined positions of the tuning elements and rotary driving means for providing continuous movement of the tuning elements from one position to another, a ball coupling device for selectively connecting the rotary driving means to the treadle bar unit, said coupling device operating in response to operation of a push button and including in combination, an inner race portion coupled to the rotary driving means, an outer race portion, a plurality of balls positioned between said inner and outer race portions, a retainer portion having apertures for receiving said balls therein positioned between said inner and outer race portions, means connecting said retainer portion to the treadle bar unit, and latch means positioned to engage said outer race portion for retaining the same against rotation to thereby provide a driving connection between the rotary driving means and the treadle bar unit, said latch means being operated in response to the operation of a push button to release said outer race portion and thereby disengage said rotary driving means from the treadle bar unit.

5. In a selector mechanism for controlling the position of tuning elements of a wave signal receiver, and which mechanism includes a treadle bar unit having push buttons for providing predetermined positions of the tuning elements and rotary driving means for providing continuous movement of the tuning elements from one position to another, a ball coupling device for selectively connecting the rotary driving means to the treadle bar unit and said coupling device operating in response to operation of a push button and including in combination, an inner race portion coupled to the rotary driving means, an outer race portion coupled to the treadle bar unit, a plurality of balls positioned between said inner and outer race portions a retainer portion having apertures for receiving said balls therein positioned between said inner and outer race portions, and latch means positioned to engage said retainer portion for holding the same against rotation to thereby provide a driving connection between the rotary driving means and the treadle bar unit, said latch means being operated in response to the operation of a push button to release said retainer portion and thereby disengage said rotary driving means from the treadle bar unit.

No references cited.